(12) United States Patent
Strickland

(10) Patent No.: US 11,224,773 B1
(45) Date of Patent: Jan. 18, 2022

(54) FIRE SUPPRESSION AND SAFETY SYSTEM

(71) Applicant: Michael Shane Strickland, Scottsboro, AL (US)

(72) Inventor: Michael Shane Strickland, Scottsboro, AL (US)

( * ) Notice: Subject to any disclaimer, the term of this patent is extended or adjusted under 35 U.S.C. 154(b) by 0 days.

(21) Appl. No.: 15/941,210

(22) Filed: Mar. 30, 2018

Related U.S. Application Data

(60) Provisional application No. 62/478,781, filed on Mar. 30, 2017.

(51) Int. Cl.
*A62C 3/02* (2006.01)
*B64C 39/02* (2006.01)
*B64D 47/08* (2006.01)

(52) U.S. Cl.
CPC ............ *A62C 3/025* (2013.01); *A62C 3/0285* (2013.01); *B64C 39/024* (2013.01); *B64D 47/08* (2013.01); *B64C 2201/024* (2013.01); *B64C 2201/121* (2013.01); *B64C 2201/146* (2013.01)

(58) Field of Classification Search
CPC ...... A62C 3/025; A62C 3/0285; B64D 47/08; B64C 39/024; B64C 2201/146; B64C 2201/024; B64C 2201/121
USPC .............................................. 169/30, 33, 53
See application file for complete search history.

(56) References Cited

U.S. PATENT DOCUMENTS

| | | | |
|---|---|---|---|
| 6,364,026 B1 * | 4/2002 | Doshay | A62C 3/0271 169/36 |
| 2004/0238186 A1 * | 12/2004 | O'Dwyer | A62C 3/025 169/47 |
| 2005/0022657 A1 * | 2/2005 | O'Dwyer | A62C 35/10 89/1.41 |
| 2006/0162940 A1 * | 7/2006 | Pohler | A62C 3/025 169/53 |
| 2017/0007865 A1 * | 1/2017 | Dor-El | A62C 3/025 |
| 2019/0023398 A1 * | 1/2019 | Albanna | B64D 1/12 |

FOREIGN PATENT DOCUMENTS

RU          0945153 A1 *  9/1999 ............... A62C 3/02

* cited by examiner

*Primary Examiner* — Qingzhang Zhou
(74) *Attorney, Agent, or Firm* — Angela Holt; Andrew Tuggle; Bradley Arant Boult Cummings LLP

(57) ABSTRACT

A system for suppressing fires from an aircraft has a munition deployment system suspended beneath the aircraft. A shield is suspended between the aircraft and the munition deployment system to protect the aircraft. The munition deployment system has munitions compartments containing munitions for deploying vertically from the munition deployment system, and for detonating over a fire. A controller within the aircraft communications with a sensor package in the munition deployment system and directs the order of munition deployment.

7 Claims, 5 Drawing Sheets

FIRE SUPPRESSION AND SAFETY SYSTEM

REFERENCE TO RELATED APPLICATIONS

This application claims priority to U.S. Provisional Patent Application No. 62/478,781, titled "Fire Suppression and Safety System," filed on Mar. 30, 2017, which is incorporated herein by reference in its entirety.

BACKGROUND AND SUMMARY

Forest fires burn millions of acres each year in the United States. Firefighters are subjected to decreased visibility, intense heat, wilderness perils, and other environmental factors such as winds and topology. The United States Departments of Agriculture and the Interior along with state governments combine resources to combat wildfires. These effort involve a diverse range of technology, thousands of firefighters and volunteers, fire engines, other ground vehicles and aircraft.

For example, large air tankers are used to drop thousands of gallons of fire retardant or water in a line. Dye is added to the water allow the pilots to see where it lands. Helicopters fill large buckets from nearby water sources such as rivers or lakes, and drop the water on the fire. Helitack crews are flown into areas where landing is not possible. Equipment is lowered to the ground in slings and firefighters rappel to the ground.

Smoke jumpers are specially trained firefighters who parachute into areas not accessible otherwise for the initial stage of the response. Firefighters and volunteers clear ground fuels such as leaves and branches with shovels and other tools to clear a path and create a fire line. Backfires are also used to prevent the fire from spreading.

The system according to the present disclosure will significantly enhance the current tools and techniques for fire suppression and personnel safety. The system will provide safe zones for personnel in hazardous conditions, remove fuel materials, and create fire breaks by deploying chemical explosives to generate blast overpressure, winds and/or disperse fire retardants. The system supplements existing tools, provides effectiveness where current tools are less effective, and provides safe zones for firefighters in hazardous positions by utilizing blast overpressure to clear fuel, disperse fire retardant chemicals, suppress wildfires and create "safe zones" for firefighter safety.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

FIG. 4AC depicts a side plan view of the shield of FIG. 4A.

DETAILED DESCRIPTION

Figure 1C:
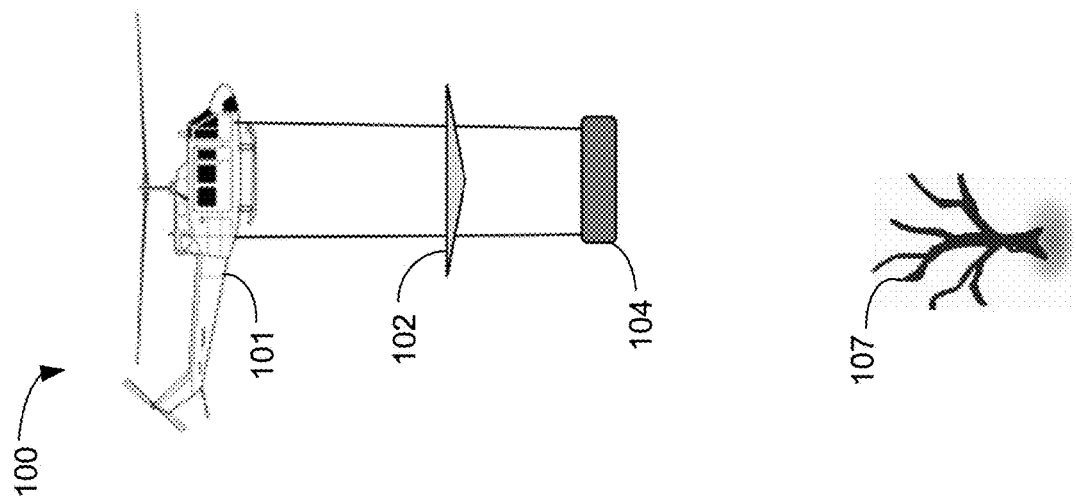
FIG. 1C depicts the system of FIG. 1A in which the blast has extinguished the fire and the target is no longer burning.
Figure 1B:
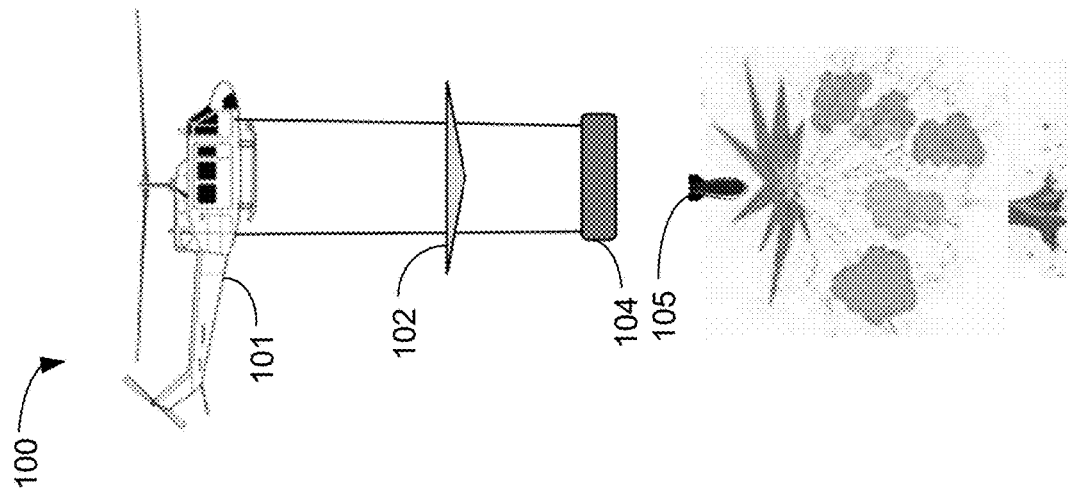
FIG. 1B depicts the system of FIG. 1A in which the munition has dropped from the missile deployment system and has detonated above the target.
Figure 1A:
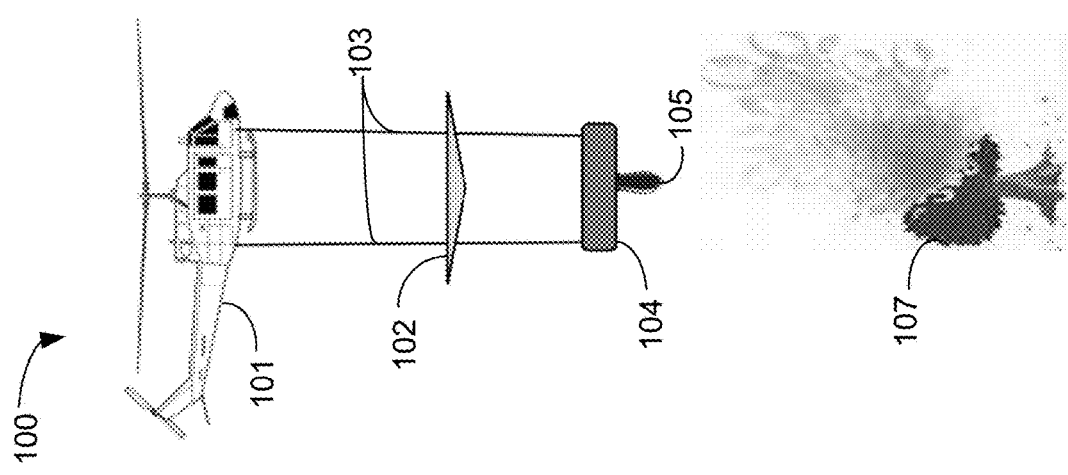
FIG. 1A depicts a fire suppression and safety system according to an exemplary embodiment of the present disclosure, where the aircraft is over a target that is on fire, and a munition is beginning to be deployed.

FIGS. 1A, 1B, and 1C depict a fire suppression and safety system 100 according to an exemplary embodiment of the present disclosure. The system 100 comprises an aircraft 101, a shield 102 suspended from the aircraft 101 by cables 103, and a munitions delivery system (MDS) 104. In FIG. 1A, the aircraft carrying the MDS 104 and shield 102 is over a target 107 which is on fire. A munition 105 is being deployed from the MDS 104 as further discussed herein. In FIG. 1B, the munition 105 has dropped from the MDS 104 and has detonated above the target 107. Typically, the detonation is timed so that the munition 105 detonates above the tree line, and not on the ground. In FIG. 1C, the blast has extinguished the fire and the target 107 is no longer burning.

The aircraft 101 comprises a rotary aircraft (helicopter) in the exemplary embodiment. In other embodiments the aircraft 101 may be a drone, a fixed wing aircraft, or any other suitable aircraft.

The shield 102 prevents fragments from munitions from blowing up and damaging the aircraft 101. The shield 102 absorbs fragmentation and redirects blast overpressure in the case of munitions failures. The shield 102 further helps to stabilize the MDS movement during flight and munitions deployment. In one embodiment, the shield 102 is formed from rubber material and/or honeycomb fragment shielding. The shield is discussed further with respect to FIG. 4 herein.

The MDS 104 is suspended from the aircraft 101 below the shield 102. The MDS comprises munitions 105 and sensors (not shown), and is further discussed below with respect to FIG. 2. The munitions 105 are deployed from the MDS and detonate above the ground.

The shield 102 and the MDS 104 are suspended from the aircraft 101 via four (4) cables 103 in the illustrated embodiment, though only two of the cables 103 are visible in FIGS. 1A-1C.

In one embodiment, the shield 102 is suspended about 50 feet below the aircraft 101, and the MDS 104 is suspended about 50 feet below the shield 102.

Figure 2A:
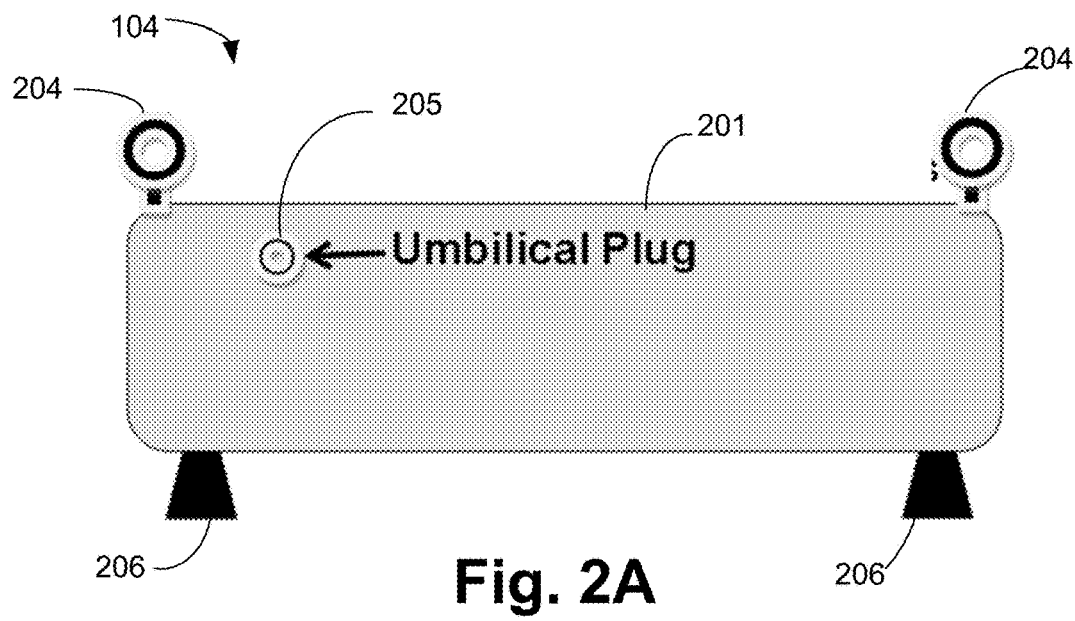
FIG. 2A depicts a side plan view of a munition delivery system according to an exemplary embodiment of the present disclosure.
Figure 2B:
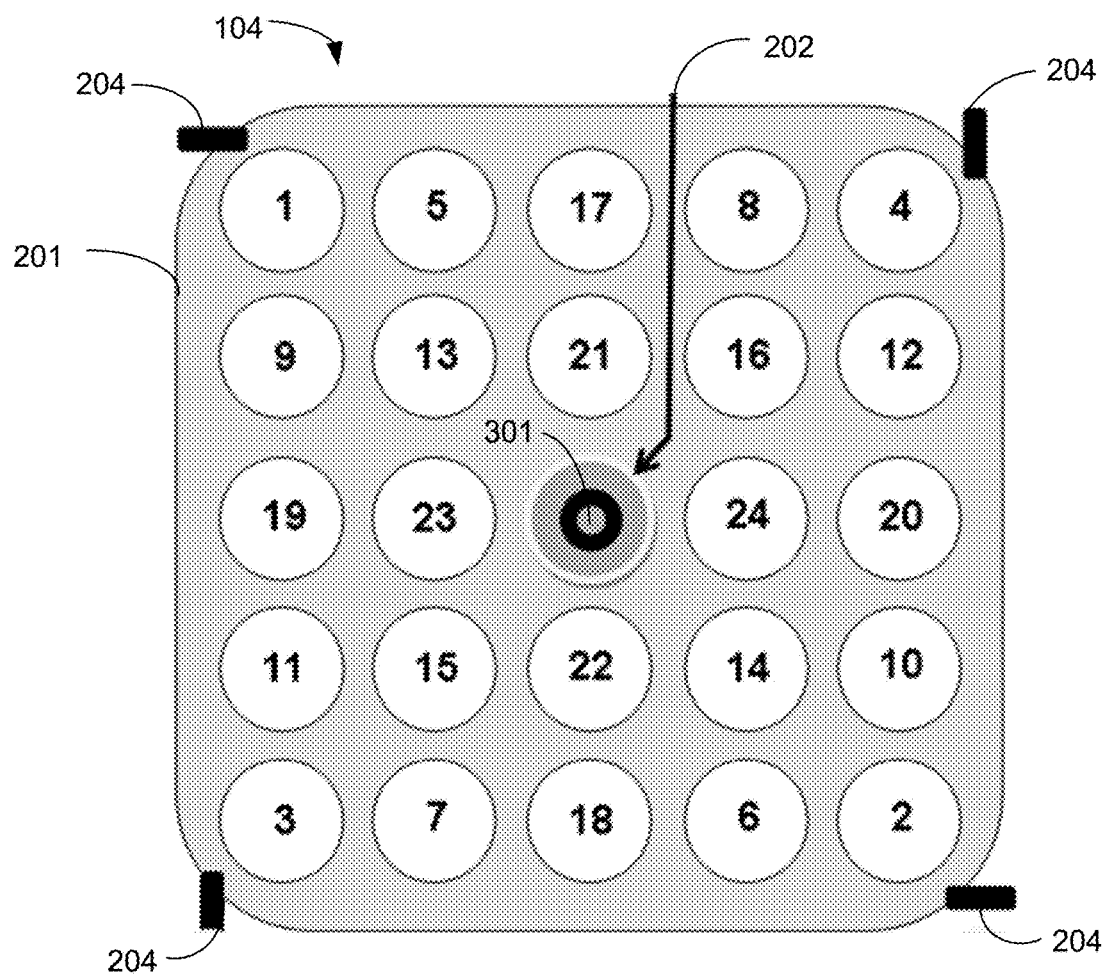
FIG. 2B depicts a top plan view of the munition delivery system of FIG. 2A.

FIGS. 2A and 2B depicts side view and bottom plan view, respectively, of a munition delivery system 104 according to an exemplary embodiment of the present disclosure. The munition delivery system 104 comprises a housing 201, munitions compartments 1-24 (FIG. 2B), and a sensor compartment 202. The munitions compartments 1-24 releasably hold munitions (not shown) for deployment. The sensor compartment 202 houses a sensor package 301 that is further discussed with respect to FIG. 3. The munitions compartments 1-24 and the sensor compartment 202 comprise generally cylindrical openings that extend through the housing generally vertically. In the illustrated embodiment, there are five rows of five compartments, for a total of 25 compartments. Other embodiments have other configurations of munitions compartments and sensor compartments.

Cable hooks 204 are disposed on the corners of the housing 201 and the cables 103 (FIG. 1) connect to the cable hooks 204 to suspend the MDS 104 from the aircraft 101 (FIG. 1). An umbilical plug 205 provides data access to the sensor device 301.

The housing 201 may be formed from aluminum, plastic, composite or other light-weight materials. The housing is attached to an air platform (not shown) via cables 103 (FIG. 1) for rotary wing/drone, purpose-built drone with pod functioning and dispensed from inside fixed wing aircraft/drone.

Spring-loaded feet 206 on the bottom of the MDS 104 allow the MDS 104 to be set down following deployment of the munitions, for reload and reuse. In this regard, the munition delivery system 104 is designed for quick reloading and turn around for quick connection to aircraft/drones. Once the MDS has expended the munitions, a hovering helicopter/drone can lower the MDS to the ground (on the spring-loaded feet 206) and ground crew can remove the cables/and or umbilical from the empty MDS and attach the cables and/or umbilical to a fully loaded MDS quickly.

In an exemplary operation of the munition delivery system 104, individual munitions (not shown) are deployed from the munitions compartments 1-24 in numerical order. The munitions are deployed one at a time, each deployment slightly overlapping the previous munition deployment, for continuous clearing during normal operation. The deployment order is designed to maintain a balance of the MDS during deployment. Specifically, in one embodiment, the munition in munitions compartment 1 is disposed in one corner of the MDS 104, and is the first munition to deploy. The second munition to deploy is then the one in munitions compartment 2, diagonally opposed to munitions compartment 2. The third munition to deploy is then the one in munitions compartment 3, which is on an opposite side from munitions compartment 2. And the fourth munition to deploy is then the one in munitions compartment 4, which is diagonally opposed to munitions compartment 3. This order of deployment serves to keep the MDS generally level and stable during deployment of the munitions.

In the illustrated embodiment, the sensor package 301 is disposed in the centermost compartment as shown.

The munitions used in the system may be blast munitions, suppressor munitions and safety munitions. In some embodiments, the munitions comprise suppressant munitions comprising foam or other fire suppressant. ANFO (ammonium nitrate and fuel oil) used in some embodiments as the explosive. Aluminum powder may be added to the explosive for increased blast effects, which makes it approximately 0.5 TNT equivalence. This mixture is not considered a high explosive, and requires a primer such as pentolite, PETN or other similar booster. Ideally, post detonation of ANFO breaks down into nitrogen, carbon dioxide, and water. ANFO generally consists of 94.3% AN and 5.7% FO by weight. Suppressor munitions may contain different types of chemical suppressants.

In one embodiment a casing of the munition is formed from biodegradable composite, which minimizes environmental impact of a detonation. A fuze section of the munition comprises a separate unit secured to the munition during loading of the MDS for safe storage and transport to the drop location.

A munition plug within the munition comprises health monitors and fuze capacitor charge connectors. A munition section of the munition contains explosive (customized or COTS) or chemical suppressant. The size, design and weight of the munition may vary depending on the application.

Where safety munitions are desired, the safety munition is designed to clear an area to provide a safe zone for firefighters. A suppressing safety munition section contains pressurized chemical fire suppressant with a burster, nozzle or other delivery system. The safety munitions function can use a larger MDS/munitions or for a standard MDS, simply drop all remaining munitions in one spot. In one embodiment, the safety munition delivery first drops standard munitions (ANFO) for clearing action and follows up by dropping suppressing safety munitions, if necessary.

Figure 3:
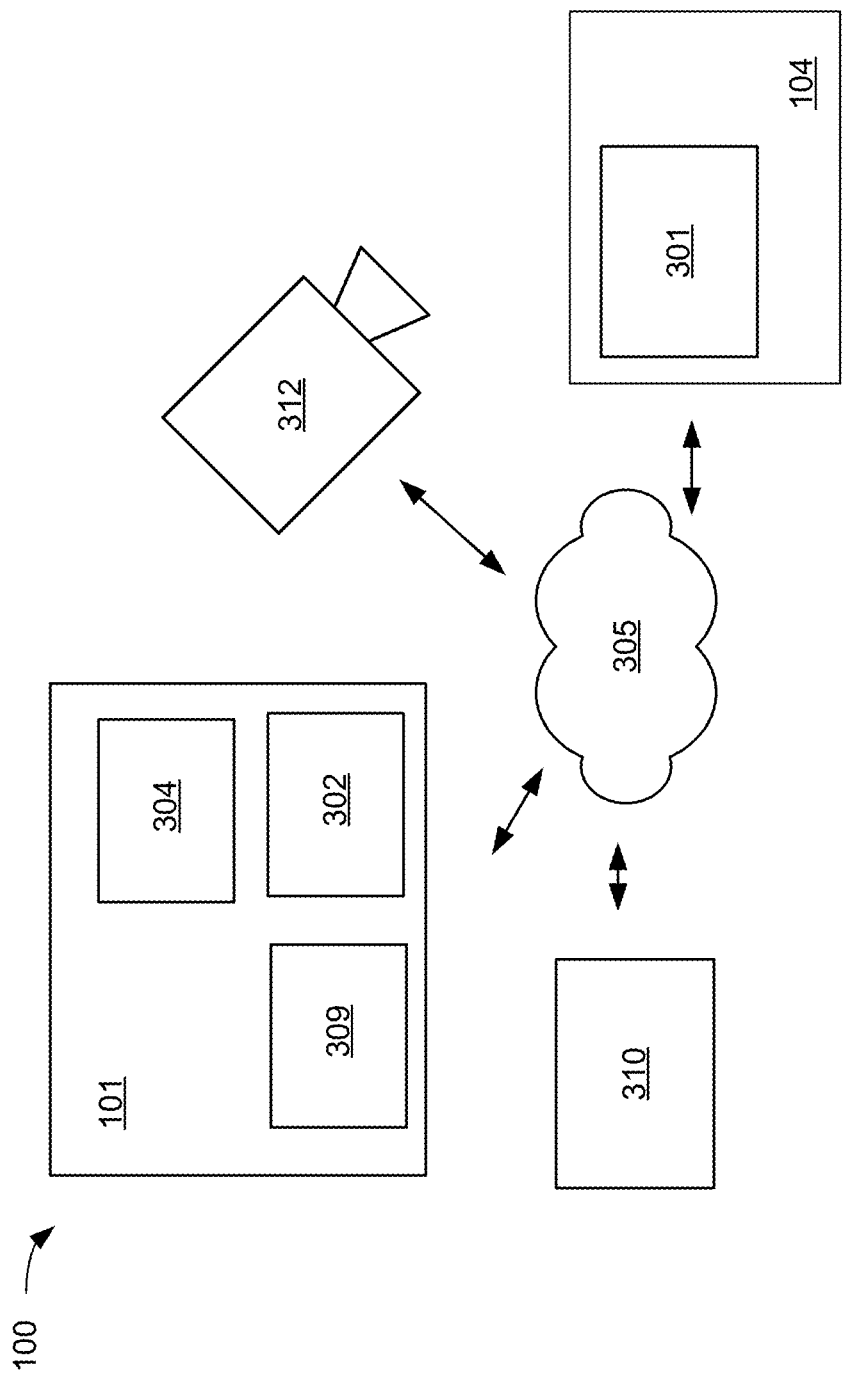
FIG. 3 is a functional block diagram of a sensor package according to an exemplary embodiment of the present disclosure.

FIG. 3 is a functional block diagram of the system 100 of FIG. 1, according to an exemplary embodiment of the present disclosure. A controller 302 resident in the aircraft 101 controls the operation of the MDS 104 and deployment of the munitions (not shown). The controller 302 communicates with the sensor package 301 within the MDS 104 to direct the deployment.

Communication between the controller 302 and sensor package 301 is via a network 305. The network 305 may be of any type network or networks known in the art or future-developed, such as the internet backbone, Ethernet, Wifi, WiMax, broadband over power line, coaxial cable, and the like. The network 305 may be any combination of hardware, software, or both.

The sensor package 301 within the MDS 104 contains instrumentation (not shown) that determines the distance to the ground and/or foliage. Examples of such instrumentation include a range finder with single or multiple sensors, altimeter, platform avionics, laser, and the like. The distance information is relayed to the controller for fuzing calculations. The sensor package 301 also provides a camera/visual feed (not shown) for manual or computer assisted operation. The sensor package 301 further transmits fuze delay to munitions as they are deployed.

The controller 302 resident in the aircraft 101 (FIG. 1) controls the operation of the MDS and deployment of the munitions. The controller 302 comprises or interfaces with a processor 303, display 304, and GPS unit 309 (and/or a connection to avionics information from the aircraft). In one embodiment, the controller 302 is connected via an umbilical cord to the sensor package 301. The controller 302 receives data from the sensor package 301 for munitions deployment and status of munition delivery system 104 and munitions in addition to saving GPS information for all munition deployment locations. For automated munitions deployment, the controller 302 interfaces with a thermal camera imaging system 312 and tracking algorithms to facilitate munition deployment automatically. In this regard, a thermal camera can detect the location of a fire and the controller can automatically direct the aircraft to the position of deployment, such that the operation of the system and the aircraft could be fully automated and pilotless.

An exemplary thermal camera has standard video and thermal imaging. A touch screen allows the pilot or an operator to select a functional mode. Functional modes include manual standard crosshair or box sight, thermal automatic (thermal tracking for automated flight), or computer assist manual.

Although FIG. 3 shows the controller 302 located within the aircraft, alternatively the controller 302 could be located on the ground, to allow for remote control of a drone, for example, by a ground-based operator.

The controller 302 receives inputs from the sensor package 301 (FIG. 3), munition delivery system 104 (FIG. 3), GPS unit 309 (FIG. 3), and/or air platform avionics package (not shown). In this regard, air platforms have an avionics package that can provide altitude, wind speed, ground speed, flight time, etc. and the output from these systems can be fed into the controller 302.

In operation of the system 100, the sensor package 301 and controller 302 select the munition to be deployed and transmit the fuze delay time as the munition is deployed.

The controller 302 connects to the sensor package 301 via an umbilical link, wirelessly, or both.

The controller 302 receives and monitors status reports from the munition delivery system and munitions, calculates fuze parameters for munition deployment, provides for manual or computer assisted targeting, and balances weight load for munition deployment. The controller 302 further may automatically deploy munitions based on air platform speed.

As each munition is deployed, the controller records the GPS location of the deployment, and transmits the location and direction vector for follow-up drops. A thermal imaging camera system may be used with tracking algorithms for automated deployment.

Figure 4A:
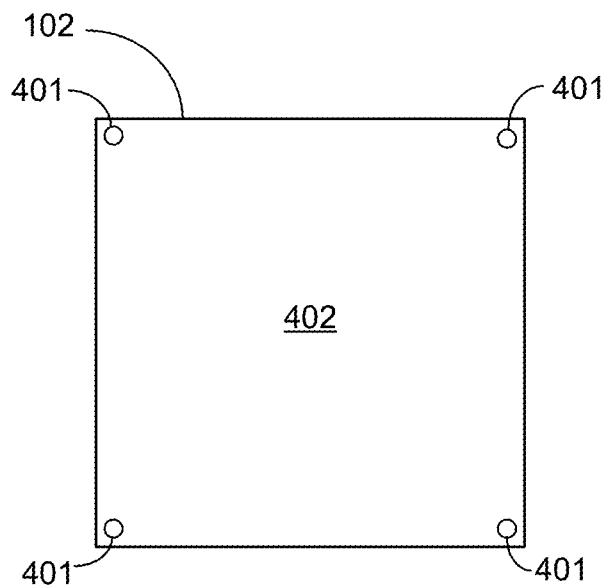
FIG. 4A depicts a top plan view of a shield according to an exemplary embodiment of the present disclosure.
Figure 4B:
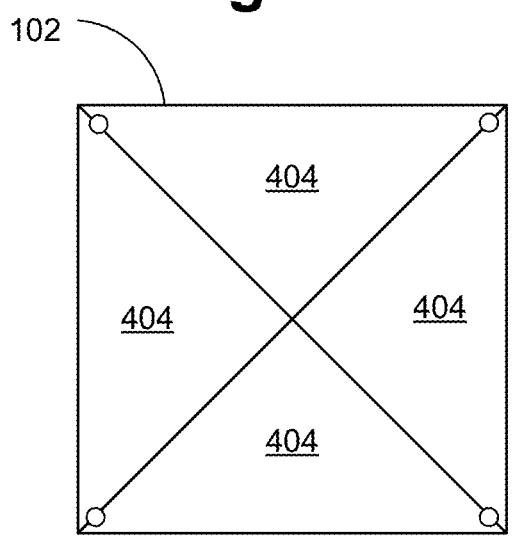
FIG. 4B depicts a bottom plan view of the shield of FIG. 4A.
Figure 4C:
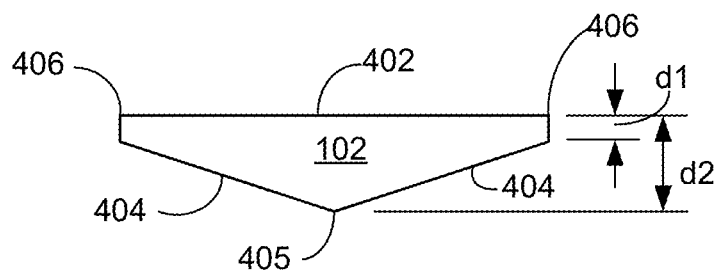

FIG. 4A-4C depict a top, bottom, and side plan view, respectively, of a shield 102 according to an exemplary embodiment of the present disclosure. The shield 102 helps to stabilize the MDS 104 (FIG. 1) from movement during flight and munition deployment. The shield 102 further shields the aircraft from the effects of munition failure, by redirecting and absorbing the blast.

In the illustrated embodiment, the shield 102 is square when viewed from the top and bottom. Openings 401 are disposed in the four corners for receiving the cables 103 (FIG. 1). Mounted "stops" (not shown) on the cables maintain the distance from the MDS and allow the shield to slide up if necessary.

The top side 402 of the shield 102 is generally flat, as shown in FIG. 4A. The bottom side of the shield 102 is comprised of four angled sides 404 that angle downwardly to a bottom point 405, as shown in FIGS. 4B and 4C. The shield 102 has a thickness of "d1" at its outside edges 406, which increases to a thickness of "d2" at the point 405. In one embodiment, d1 is 2 inches and d2 is 6 inches. In one embodiment, the shield is generally eight-to-nine feet square in size (top view).

The shield 102 is formed from a plastic honeycomb material in one embodiment, with rubber on the outside. Other materials are used in other embodiments.

Figure 5:
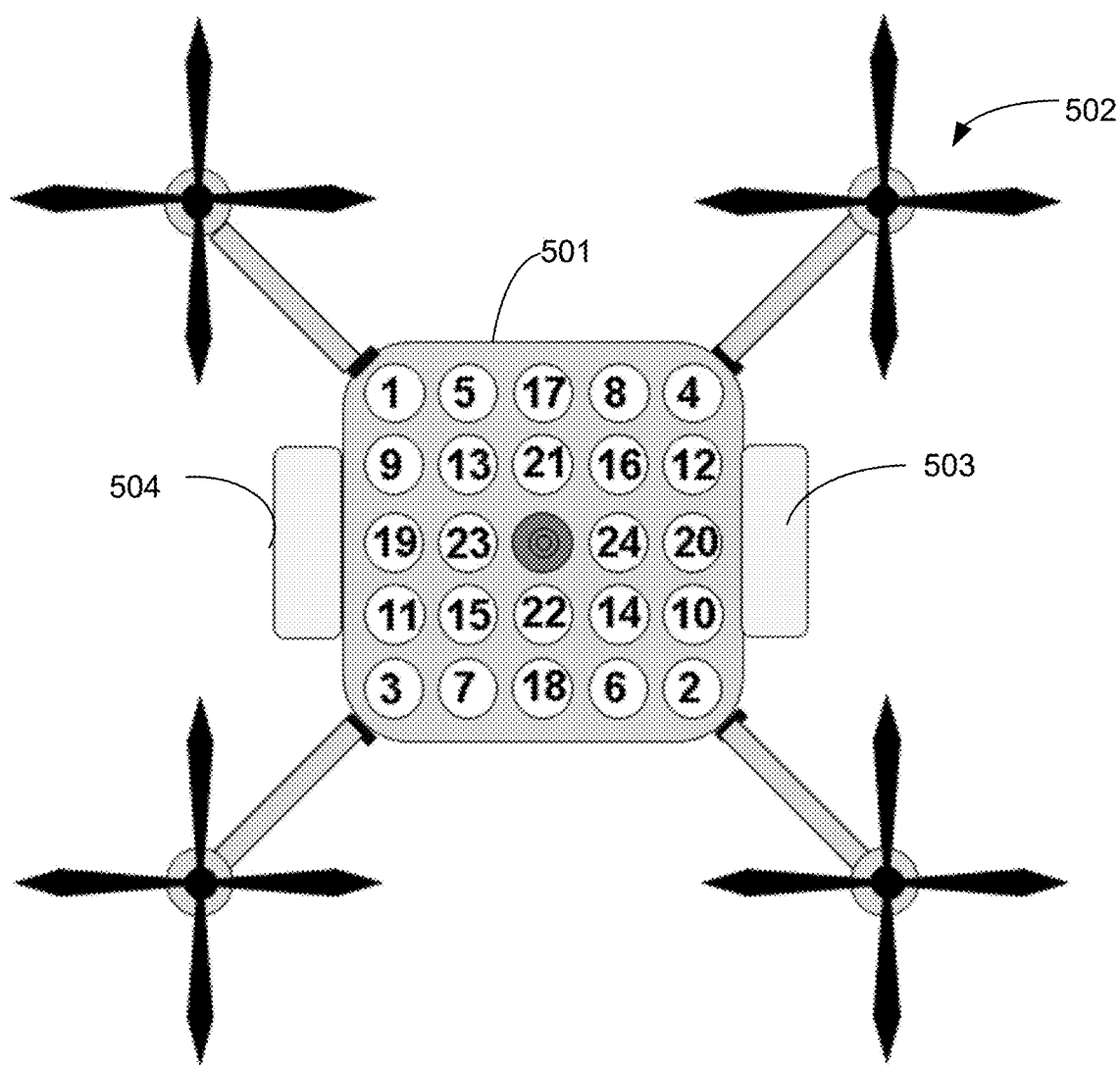
FIG. 5 depicts an alternative embodiment of a munitions delivery system integrated into a drone.

FIG. 5 is a top view of an alternative embodiment of an MDS 501 integrated into a drone 502. The drone 502 may be a fixed or rotary wing drone. The MDS 501 is substantially similar to the MDS 104 of FIG. 1. An electronics package 503 provides piloted, remote, programmed, or automated (GPS) flight path and relay start/stop information for follow-up drone coordination. A controller 504 comprises the sensor package and fuze electronics, and allows for manual, programmed, or automated operations. In this drone-based embodiment the MDS 501 is not suspended beneath the drone, but is fixed to the frame of the drone.

These and other features and advantages of the present invention will be better understood by reference to the following detailed descriptions and the accompanying drawings.

The invention claimed is:

1. A method for suppressing fires from an aircraft, the method comprising: loading a munition deployment system with munitions, the munition deployment system comprising a plurality of munition compartments comprising cylindrical openings extending vertically through a housing, the munition compartments arranged in a plurality of rows and columns, each of the plurality of munition compartments configured to receive and releasably hold one of the munitions; suspending the munition deployment system from the aircraft; suspending a shield between the aircraft and the munition deployment system to protect the aircraft, wherein the shield is suspended on at least one cable by at least one mounted stop such that, in response to a blast overpressure, the shield slides up from the at least one mounted stop; deploying the munitions from the munition deployment system via a controller serially from munition compartments on alternating opposite sides of the housing to maintain the stability of the housing, wherein the controller receives and monitors a status from the munition delivery system and calculates fuze parameters for munition deployment; and causing the munitions to detonate above the fire.

2. The method of claim 1, further comprising recording a GPS location of each munition deployment and transmitting the GPS location of each munition deployment to a user.

3. The method of claim 1, further comprising recording a ground with a thermal camera and detecting a location of the fire.

4. The method of claim 3, further comprising pilotlessly directing the aircraft to the fire and deploying the munitions over the fire.

5. The method of claim 3, further comprising piloting the aircraft via remote control from the ground and deploying the munitions over the fire.

6. A method for suppressing fires from an aircraft, the method comprising: loading a munition deployment system with munitions, the munition deployment system comprising a plurality of munitions compartments comprising cylindrical openings extending vertically through the housing, the munitions compartments arranged in a plurality of rows and columns, each of the plurality of munitions compartments configured to receive and releasably hold one of the munitions; suspending the munition deployment system from an aircraft; suspending a shield between the aircraft and the munition deployment system to protect the aircraft, wherein the shield is suspended on at least one cable by at least one mounted stop such that, in response to a blast overpressure, the shield slides up from the at least one mounted stop; deploying a first one of the munitions via a controller from a first munitions compartment in a first corner of the munition deployment system; deploying a second one of the munitions via the controller from a second munitions compartment in a second corner of the munition deployment system, the second munitions compartment diagonally disposed from the first munitions compartment; deploying a third one of the munitions via the controller from a third munitions compartment, the third munitions compartment on an opposite side from the second munitions compartment; and deploying a fourth one of the munitions via the controller from a fourth munitions compartment, the fourth munitions compartment diagonally disposed from the third munitions compartment, wherein the controller receives and monitors a status from the munition delivery system and calculates fuze parameters for munition deployment; and causing the munitions to detonate above the fire.

7. The method of claim 6, further comprising continuing to deploy munitions from munitions compartments, alternating sides of the housing to maintain the stability of the housing.

* * * * *